United States Patent
Kulkarni

(10) Patent No.: US 8,027,343 B2
(45) Date of Patent: Sep. 27, 2011

(54) COMMUNICATION SYSTEM, COMPUTER, AND METHOD FOR DETERMINING A COMMUNICATION PROTOCOL TO BE USED IN A COMMUNICATION SYSTEM

(75) Inventor: Vivek Kulkarni, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 199 days.

(21) Appl. No.: 12/281,573

(22) PCT Filed: Feb. 28, 2007

(86) PCT No.: PCT/EP2007/051897
§ 371 (c)(1),
(2), (4) Date: Sep. 3, 2008

(87) PCT Pub. No.: WO2007/099118
PCT Pub. Date: Sep. 7, 2007

(65) Prior Publication Data
US 2009/0059953 A1 Mar. 5, 2009

(30) Foreign Application Priority Data
Mar. 3, 2006 (DE) .................. 10 2006 009 988

(51) Int. Cl.
*H04L 12/28* (2006.01)
*H04J 3/16* (2006.01)
(52) U.S. Cl. .................. 370/392; 370/401; 370/466
(58) Field of Classification Search .................. 370/392, 370/401, 466
See application file for complete search history.

(56) References Cited

U.S. PATENT DOCUMENTS

| 7,174,382 B2 * | 2/2007 | Ramanathan et al. ........ 709/227 |
| 2002/0032800 A1 * | 3/2002 | Puuskari et al. .............. 709/246 |
| 2002/0194259 A1 | 12/2002 | Flykt et al. |

(Continued)

FOREIGN PATENT DOCUMENTS

| WO | WO 0211373 | 2/2002 |
| WO | WO 03084185 | 10/2003 |

OTHER PUBLICATIONS

RFC3775, Request for Comments, http:/www.ietf.org/rfc/rfc3775.txt, Jun. 2004, pp. 1-165.

*Primary Examiner* — Andrew Lee
(74) *Attorney, Agent, or Firm* — Staas & Halsey LLP

(57) ABSTRACT

The invention relates to a communication system comprising at least one first communication network designed for communication according to a first protocol, at least one second communication network designed for communication according to a second protocol, and at least one third communication network designed for communication according to the first and second protocols. The at least one first communication network and/or the at least one second communication network and/or the at least one third communication network are coupled together for the exchange of messages. The inventive system also comprises a mobile computer designed for communication according to the first and second protocols, and a target computer which is designed for communication according to the first protocol and/or the second protocol, and is associated with the first, second or third communication network. The inventive communication system is designed in such away that when the mobile computer is connected to a network connection computer of the third communication network, before the establishment of a communication connection to the target computer, the protocol to be used for communication with the network connection computer is determined.

21 Claims, 1 Drawing Sheet

U.S. PATENT DOCUMENTS

| | | | |
|---|---|---|---|
| 2003/0221016 A1* | 11/2003 | Jouppi et al. | 709/245 |
| 2004/0004940 A1* | 1/2004 | Abrol et al. | 370/252 |
| 2004/0179508 A1* | 9/2004 | Thubert et al. | 370/349 |
| 2005/0152401 A1* | 7/2005 | Wiljakka et al. | 370/474 |
| 2005/0265360 A1* | 12/2005 | Kim et al. | 370/400 |
| 2006/0126547 A1* | 6/2006 | Puuskari et al. | 370/310 |

* cited by examiner

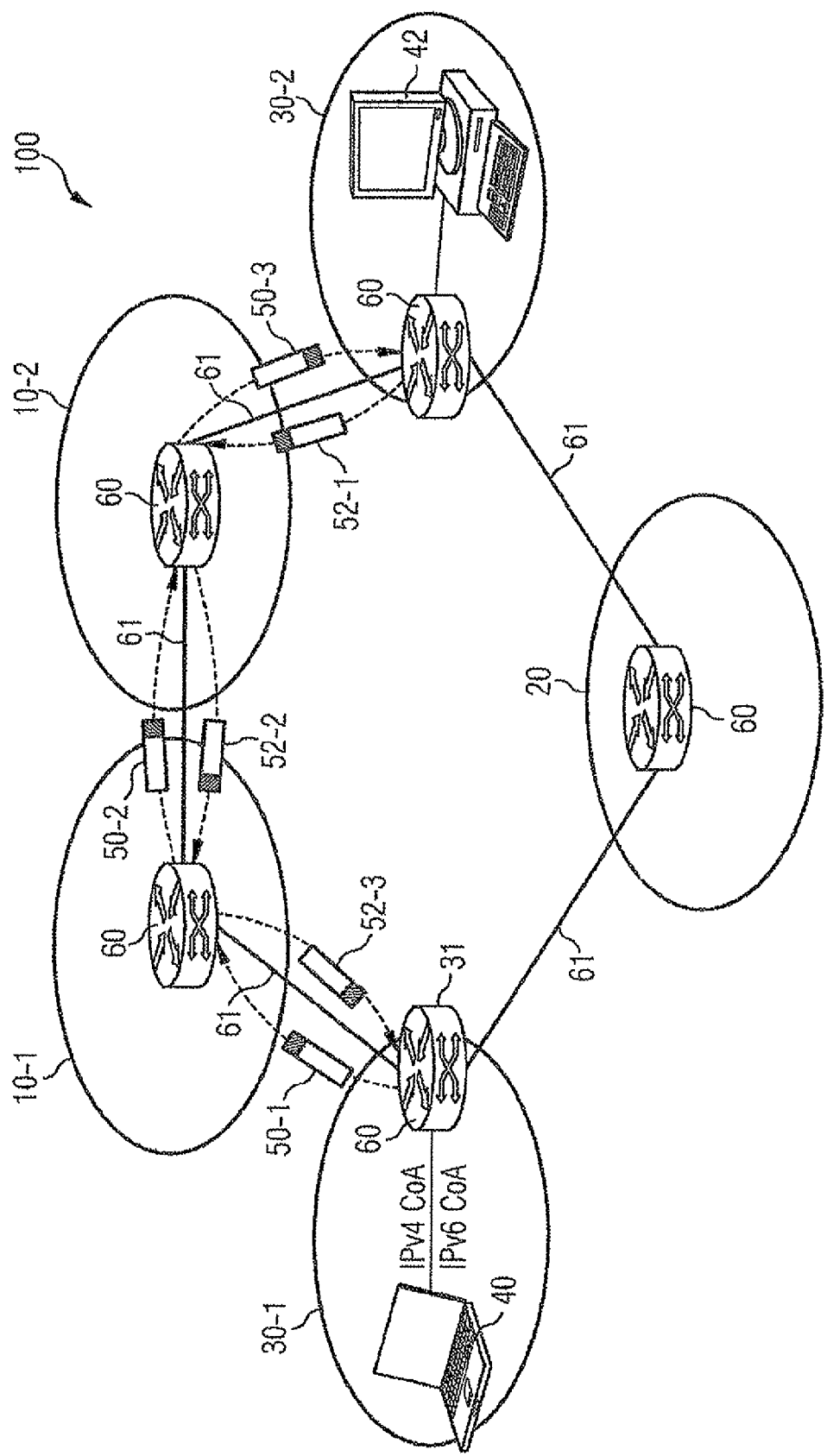

COMMUNICATION SYSTEM, COMPUTER, AND METHOD FOR DETERMINING A COMMUNICATION PROTOCOL TO BE USED IN A COMMUNICATION SYSTEM

CROSS REFERENCE TO RELATED APPLICATIONS

This application is based on and hereby claims priority to PCT Application No. PCT EP 2007/051897 filed on Feb. 28, 2007 which is based on and claims priority to German Application No. 10 2006 009 988.5 filed on Mar. 3, 2006, the contents of both of which are hereby incorporated by reference.

BACKGROUND

The embodiments to a communication system, a computer and a method for determining a communication protocol to be used in the communication system. The embodiments further relates to a computer program product that can be loaded directly into the internal memory of a digital computer as well as to a computer program product that is stored on a computer-compatible and readable medium.

IPv6, Internet Protocol Version 6, is the successor to Version 4 of the Internet Protocol (IPv4) which is currently still predominantly used on the Internet. Both protocols are standards for the network layer of the Open Source Initiative (OSI) reference model and govern the addressing and the routing of data packets through a communication network. IPv4 uses 32-bit addresses so that an address space of just over four billion IP addresses is available which can be used to address computers and other devices. In the early days of the Internet, when there were just a few networked computers that needed an IP address, this was considered to be more than adequate. However, many of the theoretical four billion IP addresses cannot in actual fact be used, since they are used for special tasks or belong to large subnetworks. As a result, in some parts of the world, especially in the IT growth market of Asia, there is currently a shortage of addresses, which requires various temporary solutions. Owing to the growth and the importance of the Internet, this could not remain a permanent state of affairs, so IPv6 was developed to remedy this problem. IPv6 provides an address space of $3.4 \cdot 10^{38}$ addresses.

As an extension of the IPv6 standard, Mobile IP was integrated in the IPv6 protocol under the name of Mobile IPv6 (RFC3775). Mobile IP provides an efficient mechanism for the mobility of computers in a communication system such as the Internet, for example. With Mobile IP it is possible for mobile computers to change their access point to the Internet but nevertheless retain their (static) IP address. To ensure the retention of the fixed IP address, Mobile IP provides each terminal with two addresses: a primary address is a so-called "home address", and a secondary address is referred to as a "care-of address" (COA). If the mobile computer leaves its so-called home network and registers in a foreign network, the latter assigns it a care-of address, which it notifies to the "home agent", a special computer in its home network. During data traffic, the home agent then forwards incoming data packets to the care-of address, and thus on to the mobile computer. If, on the other hand, the mobile computer wishes to send data packets, it can usually send them without the detour via the home agent, since the normal IP routing mechanisms ensure that the data packet reaches the destination. Once the mobile computer returns to its home network, it deregisters from its home agent again, so that data packets sent to it are again ensured without a detour via the home agent.

The situation may now occur that the foreign network to which the mobile computer is being connected can communicate both according to the IPv4 protocol and according to the IPv6 protocol. In order to be able to establish communication with a target computer, the mobile computer is therefore forced to send data packets with identical payloads both according to the IPv4 protocol and according to the IPv6 protocol. This procedure creates a heavy workload for the mobile computer and in addition creates unnecessary data traffic in the communication system.

SUMMARY

It is therefore an aspect of the embodiments to disclose a communication system and a method for determining a communication protocol to be used in a communication system which enables as efficient communication as possible of the mobile computer with a target computer in the communication system.

These objects are achieved by a communication system according to the features of claim 1, by a method according to.

A communication system according to the embodiments has the following features: at least one first communication network designed for communication according to a first protocol. At least one second communication network designed for communication according to a second protocol. At least one third communication network designed for communication according to the first and the second protocol. The at least one first communication network and/or the at least one second communication network and/or the at least one third communication network are coupled to one another for the exchange of messages. A mobile computer is designed for communication according to the first and the second protocol. A target computer is designed for communication according to the first and/or second protocol and is a computer of the first or of the second or of the third communication network. The communication system is designed in such a way that when the mobile computer is connected to a network connection computer of the third communication network, the protocol to be used for communication with the network connection computer is determined before the establishment of a communication connection to the target computer.

The invention enables an optimum transmission path between the mobile computer (in the foreign network) and the target computer to be selected. This enables optimum performance of the application being executed by the mobile computer since the mobile computer does not need to know anything about the network topology of the foreign network over the total transmission path (communication path).

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 depicts a communication system.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

According to a first embodiment of the communication system, the system is designed in such a way that the protocol to be used for communication between the mobile computer and the network connection computer is determined by the mobile computer. According to another embodiment, the communication system is designed in such a way that the protocol to be used for communication between the mobile computer and the network connection computer is determined by the network connection computer. The latter alternative has the advantage that the network connection computer can already store the knowledge about transmission paths, so that communication can be established to the target computer directly after the mobile computer has been connected to the network connection computer. The mobile computer is then relieved of the task of determining the protocol to be used for a communication.

According to another embodiment of the communication system according to the invention, the system is designed in such a way that the decision about the protocol to be used is made on the basis of statistical data about the network topology from the mobile computer to the target computer. One or more of the following types of information can be used as statistical data:

the number of protocol translations required between the mobile computer and the target computer. The protocol translation is also known to the person skilled in the art as IP version translation;

the number of hops the data packet has to be travel between the mobile computer and the target computer;

further criteria are the so-called round-trip time, the delay and the range of variation, in particular jitter, during the transmission of data packets.

It is particularly expedient if the communication system is designed in such a way that, to determine the statistical data, a query message is transmitted by a sending computer to the target computer using a hop-by-hop message transmission mechanism, wherein at least one reply message with the statistical information is transmitted by the target computer to the sending computer and is evaluated by the sending computer, the sending computer being either the mobile computer or the network connection computer. The statistical information is preferably contained in a header of the reply message.

It is also expedient if the communication system is designed in such a way that a reply message specific to each protocol is sent to the target computer in order to capture all possible transmission paths with regard to the network topology. In particular, this ensures that it is possible to determine an optimum transmission path between the mobile computer and the target computer.

Although the embodiments can in principle be applied to any protocols for data transmission, according to further embodiments it is provided that the first protocol is Internet Protocol Version 4 (IPv4), and the second protocol is Internet Protocol Version 6 (IPv6).

According to another embodiment, the communication system is designed in such a way that, following the determination of the protocol to be used, the mobile computer notifies its home agent of a temporary address (care-of address) assigned to it. This enables communication of the mobile computer in the third communication network, which constitutes the foreign network for the mobile computer.

The method according to the embodiments confers the same advantages as were set out above in connection with the communication system according to the invention.

The method according to the embodiments for determining a communication protocol to be used in a communication system of the type described above, wherein, when the mobile computer is connected to a network connection computer of the third communication network, the protocol to be used for communication with the network connection computer is determined before the establishment of a communication connection to the target computer.

According to one embodiment, the protocol to be used for communication between the mobile computer and the network connection computer is determined by the mobile computer. In an alternative variant, the protocol to be used for communication between the mobile computer and the network connection computer is determined by the network connection computer.

According to another embodiment, the decision about the protocol to be used is made on the basis of statistical data about the network topology from the mobile computer to the target computer One or more of the following types of information are used as statistical data: number of protocol translations (IP version translations), number of hops, round-trip time, delay and the range of variation, in particular jitter, during the transmission of data packets.

According to another embodiment, to determine the statistical data, a query message is transmitted by a sending computer to the target computer using a hop-by-hop message transmission mechanism, wherein a reply message with the statistical information is transmitted by the target computer to the sending computer and is evaluated by the sending computer, the sending computer being either the mobile computer or the network connection computer. A query message specific to each protocol is expediently sent by the sending computer to the target computer. It may furthermore be provided that the statistical information is inserted in a header of the reply message by each computer in the transmission path of the reply message.

Another aspect of the embodiments relates to a computer program product which can be loaded directly into the internal memory of a digital computer and comprises software code sections with which the steps of the method described above can be executed when the product runs on a computer.

A computer according to the embodiments can be connected to a communication system having the following features. At least one first communication network designed for communication according to a first protocol. At least one second communication network designed for communication according to a second protocol. At least one third communication network designed for communication according to the first and the second protocol. The at least one first communication network and/or the at least one second communication network and/or the at least one third communication network are coupled to one another for the exchange of messages. A target computer is designed for communication according to the first and/or second protocol and is a computer of the first or of the second or of the third communication network. The computer according to the invention is designed for communication according to the first and the second protocol. It is also designed in such a way that when connected to a network connection computer of the third communication network, the protocol to be used for communication with the network connection computer is determined before the establishment of a communication connection to the target computer In further embodiments the computer according to the invention is designed for carrying out the method described above. This confers the same advantages as were already described above.

Another aspect relates to another computer program product which is stored on a computer-compatible and readable medium and comprises the following;

computer-readable program capability which causes a computer, when connected to a communication network designed for communication according to a first and a second protocol, to perform a parallel or sequential communication in the first and the second protocol to a target computer;

computer-readable program capability which causes the computer to receive respective reply messages of the target computer to the query messages transmitted in the first and the second protocol;

computer-readable program capability means which causes the computer to evaluate the messages received according to the first and the second protocol with regard to the respective transmission path of the messages;

computer-readable program capability means which causes the computer to establish a communication path according to the first or the second protocol to the target computer for further communication.

Further advantages and features of the invention will be described in greater detail below with reference to FIG. 1. A communication system 100 is shown in a schematic representation.

The communication system 100 comprises communication networks 10-1, 10-2, wherein the computers contained therein (not shown in the FIGURE) are designed or set up for communication according to a first protocol, for example IPv4. A communication network 20 comprises computers (likewise not shown) networked with one another which are designed for communication according to a second protocol, for example IPv6. Communication networks 30-1, 30-2 containing networked computers (not shown) are able to communicate both according to the first and according to the second protocol, thus IPv4 and IPv6.

Each of the communication networks 10-1, 10-2, 20, 30-1, 30-2 has a plurality of network connection computers; only one network connection computer 60 is shown in each case by way of example. The communication networks 10-1, 10-2, 20, 30-1, 30-2 are, for example, networked in the manner shown in FIG. 1 by means of lines 61, with one line connecting two network connection computers 60 of different communication networks. The network connection computers 60 and the connected computers of the respective communication networks are able to exchange data with each other via the lines 61.

A mobile computer 40 designed for communication according to the first and the second protocol, that is to say according to both IPv4 and IPv6, is coupled to a network connection computer 31 of the communication network 30-1. The communication network 30-1 constitutes a foreign network for the mobile computer 40. When the mobile computer 40 is connected to the network connection computer 31 of the communication network 30-1, it is firstly necessary to decide whether the mobile computer 40 should communicate according to IPv4 or IPv6. To identify the optimum transmission path to a target computer 42, which is coupled to the network connection computer 60 of the communication network 30-2 only by way of example, the mobile computer 40 sends a query message according to IPv4 as well as according to IPv6 to the target computer 42 concurrently or with a time offset.

The query message according to IPv4, which is schematically indicated in FIG. 1 by a data packet 50-1, 50-2 and 50-3, is transmitted using known transmission mechanisms over the communication network 10-1 and the communication network 10-2 to the communication network 30-2 and the target computer 42. When passing through each network connection computer 60 in one of the communication networks, various network topology parameters, such as the number of protocol translations, the number of hops and possibly information such as round-trip time, delay and range of variation (jitter) for example, are registered.

After receiving the query message, the target computer 42 sends a reply message to the mobile computer 40. The reply message is represented schematically in FIG. 1 by data packets 52-1, 52-2 and 52-3. In the reply message, that is to say when passing through each of the network connection computers 60 of the communication networks 30-2, 10-2, 10-1 and 30-1, the aforethe information describing the network topology is added to the data packet, so that the information supplied to the mobile computer 40 enables the mobile computer 40 to evaluate the transmission path to the target computer 42.

The procedure described above may also be varied in such a way that the network topology parameters are only determined when the reply message of the target computer is passing through the respective network connection computers and is added to the data packet or packets sent to the mobile computer.

It also goes without saying that it is also possible within the framework of the invention for a plurality of data packets to be exchanged between the mobile computer 40 and the target computer in order to determine the optimum transmission path.

A query message is transmitted according to the IPv6 protocol by the mobile computer 40 in the manner described accordingly over the communication network 30-1, the communication network 20, to the communication network 30-2 and finally to the target computer 42. The target computer 42 transmits a corresponding reply message with one or more data packets over the transmission path just used to the mobile computer 40.

On the basis of the information about the transmission paths of data according to IPv4 and IPv6 now available to it, the mobile computer 40 is able to decide whether communication should be performed according to protocol IPv4 or IPv6.

The statistical data relating to the network topology is preferably determined using a hop-by-hop transmission mechanism. For instance, the RSVP (Resource Reservation Protocol) can be used for this purpose. The RSVP is one of the most important signaling protocols in the Internet protocol stack. It allows receivers to specify service requirements. As a result, certain bandwidths can be reserved for individual connections for certain applications. RSVP can also be used to reserve the quality of service (QoS) for unicast transmissions. A reservation of this type is established as follows:

1. The sender sends a special message to the receiver, the so-called RSVP Path Message. This determines a potential path from the sender to the receiver.
2. The routers passed through during this process are logged and thus notified to the receiver. The receiver then sends a further message, the so-called RSVP Reservation Message, along this path. The message contains a so-called flow specification which describes the requirements for the reservation.
3. The routers along the path reserve the resources according to the flow specification or return an error message. If the RSVP Reservation Message arrives at the sender, the latter can rely on the reservations and send according to the specification.

One alternative hop-by-hop transmission mechanism that can be used in the context of the present application is traceroute. Traceroute is a diagnostics tool that can be used to determine via which IP routers data packets are switched to the target computer. For this purpose, traceroute sends multiple packets to the target computer. If a router receives a packet and would need to switch the packet, it discards it and sends an ICMP reply back to the sender with its address. The sum of the addresses collected in this way indicates the path through the network to the destination. The return path is usually identical.

The transmission of the information indicating the network topology could, for example, be accomplished by modifying the header of the respective transmission method used, such as the above-described RSVP protocol or traceroute.

The decision as to which protocol the mobile computer wishes to use to establish communication with the network connection computer 60 may be made for example on the basis of criteria such as the number of hops, the number of IP protocol translations required, etc. In addition, other further criteria could be used to make the decision. Once the respective IP protocol has been selected, the mobile computer notifies its home agent, which in the present exemplary embodiment may be arranged in any of the communication networks, of its care-of address.

In contrast to the above description, the functionality of determining the network statistics can also be implemented in the network connection computer 31.

The advantages conferred by the present invention are that it is possible to identify the optimum transmission path through a plurality of communication networks that communicate according to IPv4 and/or IPv6 protocols. In addition, the performance of applications in combined IPv4 and IPv6 communication networks is increased. The invention minimizes mobility management inefficiencies in a combined IPv4 and IPv6 communication network.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir 2004).

The invention claimed is:

1. A communication system, comprising:
at least one first communication network designed for communication according to a first protocol;
at least one second communication network designed for communication according to a second protocol;
at least one third communication network designed for communication according to the first and the second protocol, wherein the at least one first communication network and/or the at least one second communication network and/or the at least one third communication networks are coupled to one another for the exchange of messages;
a mobile computer designed for communication according to the first and the second protocol; and
a target computer that is designed for communication according to the first and/or second protocol and is a computer of the first or of the second or of the third communication network, and
wherein when the mobile computer is connected to a network connection computer of the third communication network, the protocol to be used for communication with the network connection computer is determined before the establishment of a communication connection to the target computer,
wherein the determination comprises a query message being transmitted by a sending computer to the target computer using a hop-by-hop message transmission mechanism, and at least one reply message being transmitted by the target computer to the sending computer and evaluated by the sending computer, the sending computer being either the mobile computer or the network connection computer.

2. The communication system as claimed in claim 1, wherein the protocol used for communication between the mobile computer and the network connection computer is determined by the mobile computer.

3. The communication system as claimed in claim 1, wherein the protocol used for communication between the mobile computer and the network connection computer is determined by the network connection computer.

4. The communication system as claimed in claim 1, wherein the determination about the protocol used is made on the basis of statistical data about network topology from the mobile computer to the target computer.

5. The communication system as claimed in claim 1, wherein the statistical data comprises one or more of: number of protocol translations, in particular IP version translations, number of hops, round-trip time, delay, and range of variation, in particular jitter.

6. The communication system as claimed in claim 1, wherein the statistical information is contained in a header of the reply message.

7. The communication system as claimed in claim 1, wherein the system is designed in such a way that a query message specific to each protocol is sent to the target computer.

8. The communication system as claimed in claim 1, wherein the first protocol is Internet Protocol Version 4.

9. The communication system as claimed in claim 1, wherein the second protocol is Internet Protocol Version 6.

10. The communication system as claimed in claim 1, wherein following the determination of the protocol to be used, the mobile computer notifies its home agent of a temporary address assigned to it.

11. A method for determining a communication protocol to be used in a communication system having at least one first communication network designed for communication according to a first protocol, at least one second communication network designed for communication according to a second protocol, at least one third communication network designed for communication according to the first and the second protocol, where the at least one first communication network and/or the at least one second communication network and/or the at least one third communication networks are coupled to one another for the exchange of messages, a mobile computer designed for communication according to the first and the second protocol, a target computer that is designed for communication according to the first and/or second protocol and is a computer of the first or of the second or of the third communication network, said method comprising:
determining, when the mobile computer is connected to a network connection computer of the third communication network, the protocol to be used for communication with the network connection computer before the establishment of a communication connection to the target computer, wherein the determining comprises transmitting a query message by a sending computer to the target computer using a hop-by-hop message transmission mechanism, transmitting a reply message by the target computer to the sending computer and evaluating by the sending computer, the sending computer being either the mobile computer or the network connection computer.

12. The method as claimed in claim 11, wherein the protocol used for communication between the mobile computer and the network connection computer is determined by the mobile computer.

13. The method as claimed in claim 11, wherein the protocol used for communication between the mobile computer and the network connection computer is determined by the network connection computer.

14. The method as claimed in claim 11, wherein the determining about the protocol used is made on the basis of statistical data about the network topology from the mobile computer to the target computer.

15. The method as claimed in claim 11, wherein the statistical data comprises one or more of: number of protocol translations, in particular IP version translations, number of hops, round-trip time, delay, and range of variation, in particular jitter.

16. The method as claimed in claim 11, wherein a query message specific to each protocol is sent by the sending computer to the target computer.

17. The method as claimed in claim 11, wherein the statistical information is inserted in a header of the reply message by each computer in the transmission path of the reply message.

18. An apparatus that can be connected to a communication system having at least one first communication network designed for communication according to a first protocol, at least one second communication network designed for communication according to a second protocol, at least one third communication network designed for communication according to the first and the second protocol, wherein the at least one first communication network and/or the at least one second communication network and/or the at least one third communication networks are coupled to one another for the exchange of messages, a target computer that is designed for communication according to the first and/or second protocol and is a computer of the first or of the second or of the third communication network, said apparatus comprising:
a system computer capable of communication according to the first and the second protocol and when connected to a network connection computer of the third communication network, the protocol used for communication with the network connection computer is determined before the establishment of a communication connection to the target computer,
wherein the determination comprises a query message being transmitted by a sending computer to the target computer using a hop-by-hop message transmission mechanism, and at least one reply message being transmitted by the target computer to the sending computer and evaluated by the sending computer, the sending computer being either a mobile computer or the network connection computer.

19. The apparatus as claimed in claim 18, wherein the computer operates by determining, when a mobile computer is connected to a network connection computer of the third communication network, the protocol to be used for communication with the network connection computer before the establishment of a communication connection to the target computer, wherein the determining comprises transmitting a query message by a sending computer to the target computer using a hop-by-hop message transmission mechanism, transmitting a reply message by the target computer to the sending computer and evaluating by the sending computer, the sending computer being either the mobile computer or the network connection computer.

20. A computer program product which can be loaded directly into an internal memory of a digital computer and comprises software code sections with which the steps as claimed in claim 11 can be executed when the product runs on a computer.

21. A computer program product which is stored on a computer-compatible and computer readable medium for controlling the computer, comprising:
computer-readable program capability which causes a computer, when connected to a communication networks designed for communication according to a first and a second protocol, to perform a parallel or sequential communication in the first and the second protocol to a target computer;
computer-readable program capability which causes the computer to receive respective reply messages of the target computer to the query messages transmitted in the first and the second protocol;
computer-readable program capability which causes the computer to evaluate the messages received according to the first and the second protocol with regard to the respective transmission path of the messages over the network; and
computer-readable program capability which causes the computer to establish a communication path according to the first or the second protocol to the target computer for further communication,
wherein the establishment comprises a query message being transmitted by a sending computer to the target computer using a hop-by-hop message transmission mechanism, and at least one reply message being transmitted by the target computer to the sending computer and evaluated by the sending computer, the sending computer being either a mobile computer or a network connection computer.

* * * * *